(12) United States Patent
He

(10) Patent No.: US 7,257,375 B1
(45) Date of Patent: Aug. 14, 2007

(54) RECEIVER WITH DUAL D.C. NOISE CANCELLATION CIRCUITS

(75) Inventor: Runsheng He, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 126 days.

(21) Appl. No.: 11/028,223

(22) Filed: Jan. 4, 2005

Related U.S. Application Data

(63) Continuation of application No. 09/536,120, filed on Mar. 27, 2000, now Pat. No. 6,856,790.

(51) Int. Cl.
*H04B 1/00* (2006.01)
*H04B 17/00* (2006.01)
*H04B 1/18* (2006.01)

(52) U.S. Cl. ............... 455/63.1; 455/226.4; 455/151.2; 375/319

(58) Field of Classification Search ............... 455/63.1, 455/226.4, 67.13, 353, 151.2, 277.2, 226.1
See application file for complete search history.

(56) References Cited

U.S. PATENT DOCUMENTS

| | | | |
|---|---|---|---|
| 4,222,051 A * | 9/1980 | Kretschmer et al. ........ 342/379 |
| 4,486,740 A | 12/1984 | Seidel | |
| 5,095,496 A | 3/1992 | Jang | |
| 5,140,699 A * | 8/1992 | Kozak ......................... 455/84 |
| 5,471,665 A | 11/1995 | Pace et al. | |
| 5,687,229 A | 11/1997 | Sih | |
| 5,724,653 A | 3/1998 | Baker et al. | |
| 5,867,062 A | 2/1999 | Kudou | |
| 5,903,853 A | 5/1999 | Sano | |
| 6,009,126 A | 12/1999 | Van Bezooijen | |
| 6,219,088 B1 | 4/2001 | Liu et al. | |
| 6,311,051 B1 | 10/2001 | Jung | |
| 6,697,611 B1 | 2/2004 | Franca-Neto | |

OTHER PUBLICATIONS

IEEE Std 802.3-2002 (Revision of IEEE Std. 802.3, 2000 Edition); IEEE Standard for Information technology-Telecommunications and information exchange between systems-Local and metropolitan area networks-Specific requirements-Part 3: Carrier sense multiple access with collision detection (CSMA/CD) access method and physical layer specifications; Sponsored by the LAN/MAN Standards Committee of the IEEE Computer Society; Mar. 8, 2002; 1538 pages.

* cited by examiner

*Primary Examiner*—Tilahun Gesesse

(57) ABSTRACT

A receiver for eliminating D.C. noise from a signal received from a communication channel includes an input circuit configured to receive an input signal. The receiver includes an error circuit configured to generate an error signal in accordance with the input signal from the input circuit. The receiver includes a first noise canceler responsive to the error circuit. The first noise canceler is configured to generate a first noise cancellation signal in response to the error signal from the error circuit. The receiver includes a second noise canceler responsive to the error circuit and the first noise canceler. The second noise canceler is configured to generate a second noise cancellation signal from the error signal from the error circuit and the first noise cancellation signal from the first noise canceler. The input circuit is responsive to the second noise cancellation signal from the second noise canceler.

36 Claims, 4 Drawing Sheets

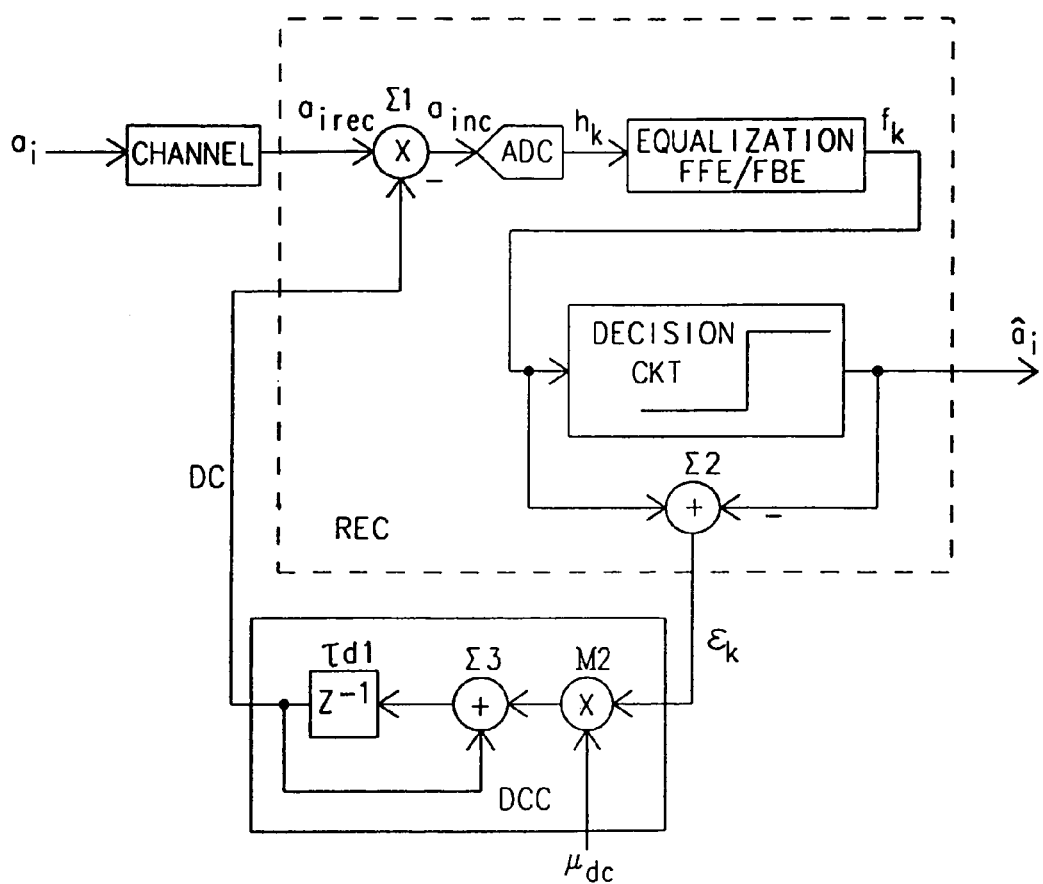
*FIG. 1 – Prior Art*

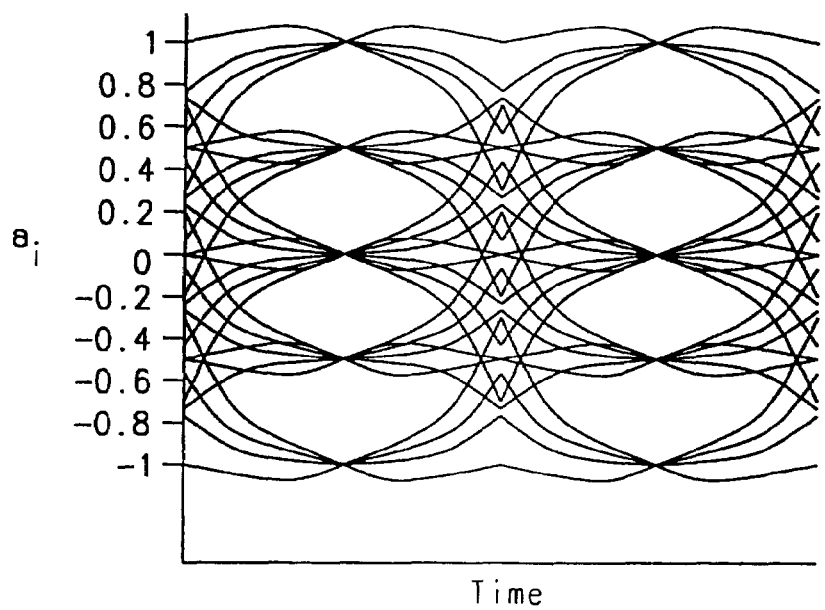
*FIG. 2a – Prior Art*
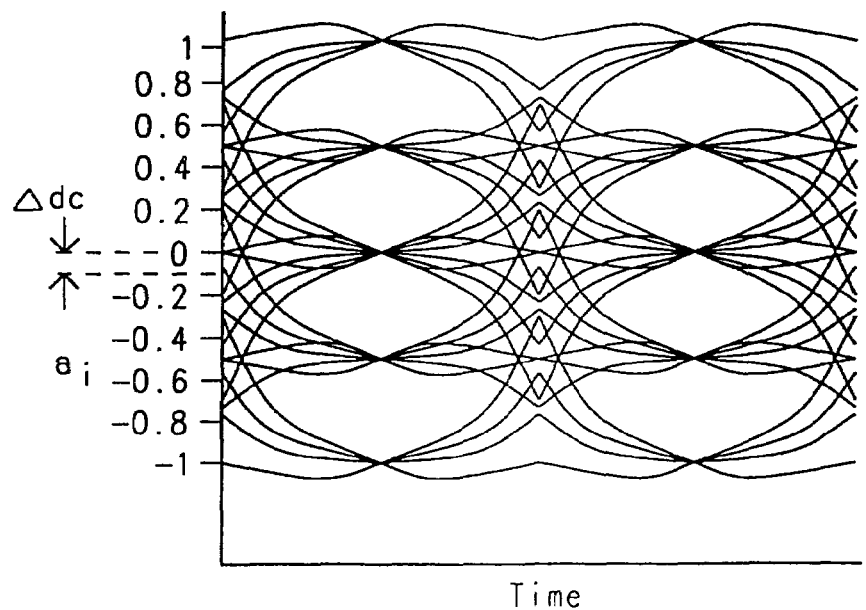
*FIG. 2b – Prior Art*

RECEIVER WITH DUAL D.C. NOISE CANCELLATION CIRCUITS

This application is a continuation of U.S. application Ser. No. 09/536,120, filed Mar. 27, 2000, now U.S. Pat. No. 6,856,790 the entire contents of which are incorporated by reference herein.

BACKGROUND

1. Field of the Invention

This invention is related to noise reduction in communication systems such as Ethernet. More particularly, this invention is related to reduction of D.C. noise components in a signal received from a communication channel.

2. Background Information

The structures of digital communications such as Ethernet, as described in the Institute of Electrical and Electronic Engineers (IEEE) specification IEEE 802.3, are well known in the art. To improve reception of encoded signals from a communication channel, noise components must be determined and subtracted from the received signal. One of the noise components induced within the communication channel is referred to as D.C. noise. Refer to FIGS. 2a and 2b to understand the definition and the effect of D.C. noise components on the received signal $a_i$. FIG. 2a shows an eye diagram of a received signal $a_i$ of a five-level amplitude-modulated signal. Each voltage level represents one of the code values of the digital signal being transferred. In an ideal communication system, each "eye" of the eye diagram would be nearly rectangular. The more "closed" the "eye," the more noise induced on the communication channel. Low frequency or D.C. noise components that are a result of the encoding of the digital data or that are induced on the communication channel may actually shift the D.C. voltage level as shown in FIG. 2b. In this example, the whole signal $a_i$ is shifted by a D.C. voltage level $\Delta_{dc}$. The effect of the D.C. noise components is to degrade the performance of the circuitry that decoded the received signal $a_i$ to recover the digital data. This implies a higher error rate of the data received, thus requiring more robust error recovery and slower data transmission.

Further, as can be seen in FIG. 2b, the receiver must have a wider dynamic range. That is the voltage range that the receiver recognizes, as the signal $a_i$ must be larger.

Refer now to FIG. 1 for a discussion of a receiver and a D.C. noise cancellation circuit of the prior art. The multiple level amplitude-modulated signal $a_i$ is transferred to the communication channel. The received signal $a_{irec}$ having D.C. noise components, as shown in FIG. 2b, is the input to the receiver. Typically, it is desirable to remove as much of the D.C. noise components as early as possible in the receiving of the signal $a_{irec}$. Typically, a D.C. noise canceling signal is subtractively combined in a first summing circuit $\Sigma 1$ with the received signal $a_{irec}$ to remove the D.C. noise components. The signal $a_{inc}$ with the D.C. noise components removed is the input to the analog-to-digital converter.

The analog-to-digital converter creates a set of sampled digital data $h_k$ indicating the amplitude of the received signal $a_{inc}$ with the D.C. noise components removed. The sampled digital data is created at discrete periods of a sampling clock and is retained or buffered as needed in a memory or registers (not shown).

As is known in the art, the communication channel acts as a lowpass filter causing what is termed intersymbol interference where noise components from adjacent symbols of the encoded data interfere with the current symbol. The feedforward or feedback equalizer removes any of the intersymbol interference to create the equalized sampled digital data of the received signal $f_k$. The equalized sampled digital data $f_k$ is the input of the decision circuit that determines an estimate of the transmitted value of the signal $\hat{a}_k$.

An error signal $\epsilon_k$ is determined as the difference between the equalized sampled digital data $f_k$ and the estimated value of the signal $\hat{a}_k$. The equalized sampled digital data $f_k$ and the estimated values of the signal $\hat{a}_k$ are the inputs to the second summing circuit $\Sigma 2$. The second summing circuit $\Sigma 2$ subtractively combines the equalized sampled digital data $f_k$ and the estimated values of the signal $\hat{a}_k$ to form the error signal $\epsilon_k$.

The error signal $\epsilon_k$ is used to determine the level of the D.C. noise component that needs to be removed from the received signal.

The error signal $\epsilon_k$ is the input to the D.C. noise canceling circuit DCC. The error signal, further, is the input of the multiplier circuit M1. The second input of the multiplier circuit M1 is a gain constant $\mu_{dc}$. The gain constant $\mu_{dc}$ is chosen to be sufficiently small to make the noise cancellation stable, but sufficiently large to track any slow variation in the D.C. voltage level of the received signal $a_{irec}$. The range of the gain constant $\mu_{dc}$ is dependent on the condition of the communication channel.

The output of the multiplier circuit M1 is one input of a third summing circuit $\Sigma 3$. The second input of the third summing circuit $\Sigma 3$ is the value of the D.C. noise cancellation signal for the previous sample period, and the output of the third summing circuit $\Sigma 3$ is the D.C. noise cancellation signal for the previous sampling period of the received signal $a_{irec}$. The output of the third summing circuit $\Sigma 3$ is the input of the delaying circuit $\tau_{d1}$. The output of the delaying circuit $\tau_{d1}$ is the input to the first summing circuit $\Sigma 1$ to remove the D.C. noise component from the received signal $a_{irec}$.

U.S. Pat. No. 4,486,740 (Seidel) describes a circuit for DC noise cancellation in ternary-coded data systems. An encoder processes an input signal to produce a ternary coded data stream having suppressed DC. The data stream is augmented with a compensating set of code symbols as determined by the number of positive and negative code symbols in the data stream as well as all prior compensating code symbols. A decoder processes the received signal to extract the symbols in the data stream corresponding to the input signal. In order to achieve a pre-selected end-to-end transmission rate with the encoder-decoder combination, the rate of the signal propagated between encoder and decoder is increased to compensate for the appended code symbols.

SUMMARY OF THE INVENTION

It is an object of this invention to provide a circuit to eliminate D.C. noise from a signal received from a communication channel.

Another object of this invention is to provide a circuit employing dual adaptive D.C. noise cancellation loops to eliminate D.C. noise from a signal received from a communication channel.

An additional object of this invention is to provide a circuit employing two adaptive D.C. noise cancellation loops that are decoupled to insured stability of the circuit while eliminating D.C. noise components from a signal received from a communication channel.

To accomplish these and other objects a circuit within a receiver of a communication system is provided for removing D.C. noise components from a signal acquired by the receiver. The circuit has a first D.C. noise canceler that generates a first D.C. noise cancellation signal. An input is connected within the receiver to an output of an error circuit, which determines an error signal that is an estimate of D.C. noise within the signal. The first D.C. noise canceler has an output connected within the receiver to an input of a decision circuit that subtractively combines the first D.C. noise cancellation signal with the signal to remove a first portion of the D.C. noise components. The circuit has a second D.C. noise canceler with an input to receive the first D.C. noise cancellation signal, a second input connected to the output of the error circuit to receive the error signal, and an output connected to the input of the receiver to subtractively combine the received signal acquired from the communication channel with the second D.C. noise cancellation signal to remove a second portion of the D.C. noise components.

The first D.C. noise canceler forms the first noise cancellation signal as a function of the error signal according to the formula:

$$DC1_{n+1} = DC1_n + \mu_{dc1} \times \epsilon_k$$

where:

$DC1_n$ is the first noise cancellation signal for the current sampling time of the received signal;

$DC1_{n+1}$ is the first noise cancellation signal for the next sampling time of the received signal;

$\mu dc1$ is a first loop gain constant;

$\epsilon_k$ is the error signal determined by the formula:

$$\epsilon_k = f_{knc} - \hat{a}_k$$

where:

$\hat{a}_k$ is the estimated value of the transmitted signal;

$f_{knc}$ is an equalized, noise cancelled received signal of the current sampling.

The second D.C. noise canceler forms the second noise cancellation signal as a function of the error signal according to the formula:

$$DC2_{n+1} = DC2_n + \mu_{dc1} \times (\epsilon_k + DC1_n)$$

where:

$DC2_n$ is the second noise cancellation signal for the current sampling time of the received signal;

$DC2_{n+1}$ is the second noise cancellation signal for the next sampling time of the received signal;

$\mu_{dc2}$ is a second loop gain constant;

$\epsilon_k$ is the error signal determined by the formula:

$$\epsilon_k = f_{knc} - \hat{a}_k$$

where:

$\hat{a}_k$ is the estimated value of the transmitted signal;

$f_{knc}$ is an equalized, noise cancelled received signal of the current sampling;

$DC1_n$ is the first noise cancellation signal for the current sampling time of the input signal.

The first D.C. noise canceler includes a first multiplication circuit, which is connected to the input to receive the error signal and to multiply the error signal by a first loop gain constant to produce a first product. The first product is an input to a first additive combining circuit. The first additive combining circuits is additionally connected to the output of the first D.C. noise canceler to receive a current first D.C. noise cancellation signal. The first additive combining circuit additively combines the first product with the current first D.C. noise cancellation signal to produce a next first D.C. noise cancellation signal. A first unit delay circuit is connected to the first additive combining circuit to delay the first D.C. noise cancellation signal by one sampling time.

The second D.C. noise canceler has a second additive combining circuit connected to receive the error signal at the first input and to receive the first D.C. noise cancellation signal at the second input. The error signal and the first D.C. noise cancellation signal are additively combined to form a first sum, which restores the first D.C. noise cancellation signal to the error signal. A second multiplication circuit is connected to the second additive circuit to receive the first sum and to multiply the first sum by a gain constant to produce a second product. Connected to the second multiplication circuit is a third additive combining circuit to receive the second product and to the output of the second D.C. noise canceler to receive a current second D.C. noise cancellation signal. The third additive combining circuit additively combines the second product with the current second D.C. noise cancellation signal to produce a next second D.C. noise cancellation signal. Connected to the output of the third additive combining circuit is a second unit delay circuit to delay the second D.C. noise cancellation signal by one sampling time.

The first and second loop gain constants are chosen to have values that are sufficiently small to insure stable operation of the first and second noise cancelers. However, the first and second loop gain constants must be sufficiently large to track any slow variation in the level of the D.C. noise present in the received signal.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein:

FIG. 1 is a system schematic diagram of a receiver of the prior art.

FIGS. 2a and 2b are eye diagrams of a signal received from a communication channel.

DETAILED DESCRIPTION OF THE PREFERRED EMBODIMENTS

A drawback of an adaptive loop created by the D.C. noise canceling circuit of FIG. 1 is the large time latency from the analog-to-digital converter of FIG. 1 to the decision circuit of FIG. 1. The long time latency results in less accuracy in the determination of the D.C. noise component and thus allowing a residual D.C. noise component to remain.

A solution to the long time latency of a single adaptive loop is a dual adaptive loop terminating at the input of the decision circuit of FIG. 1. A second potential problem in using two adaptive loops to cancel the D.C. noise is that the two loops are coupled together and can cause stability problems.

Figure 3:
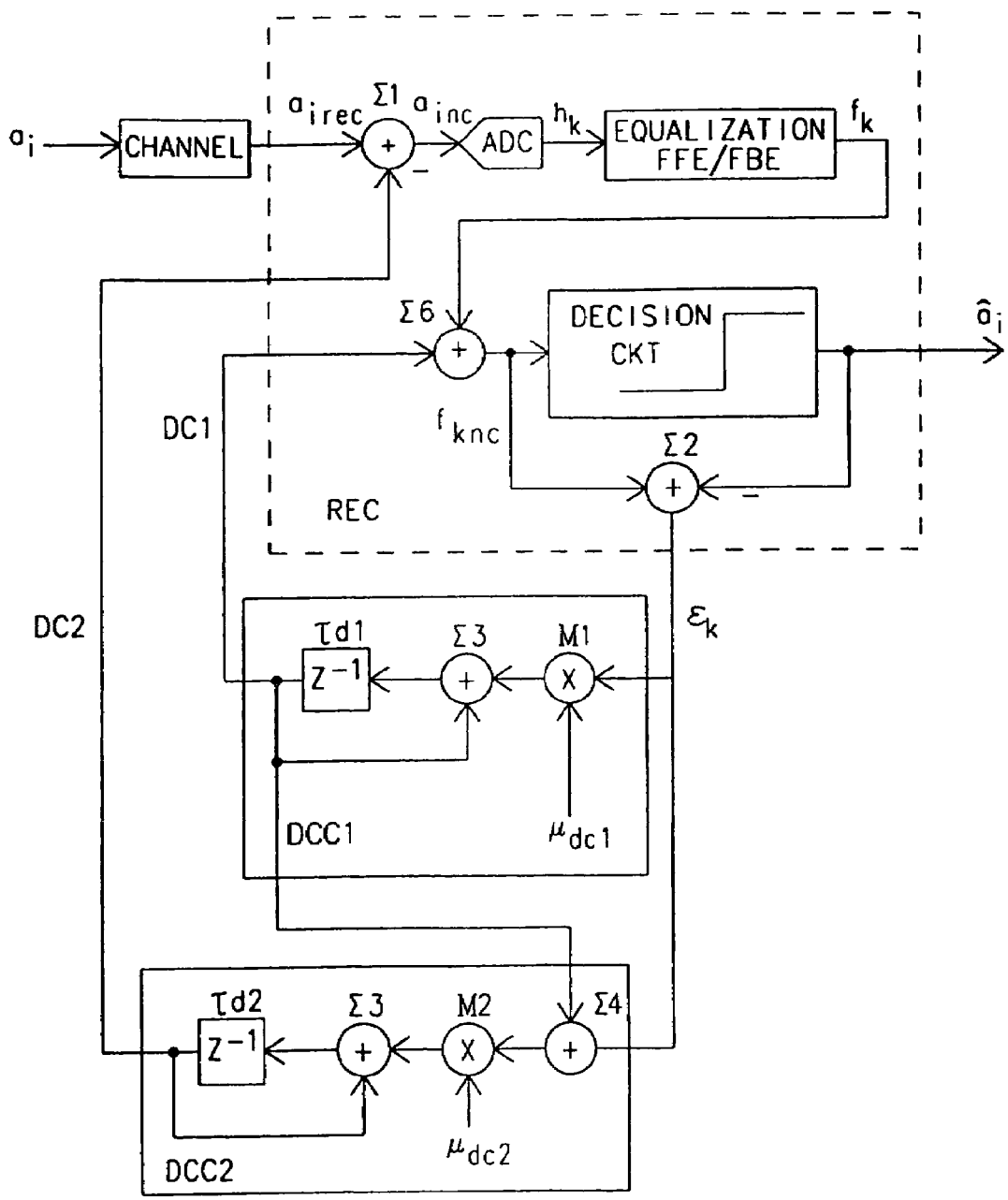
FIG. 3 is a system schematic diagram of a receiver having noise cancellation circuitry of this invention.

Refer now to FIG. 3 for a discussion of a receiver within a communication circuit containing two D.C. noise cancellation circuits. The basic receiver structure is as described above in FIG. 1 with a signal $a_i$ traversing a communication channel to the input of the receiver. The analog-to-digital converter samples the received signal having D.C. noise components removed periodically and converts these samples to a sampling digital data $h_k$ indicating the amplitude of the received signal $a_{irec}$ at the sampling times. The sampled digital data $h_k$ is transferred to the feedforward/feedback equalization circuit for removal of intersymbol interference noise components to create an equalized sampled digital data $f_k$. The equalized sampled digital data $f_k$ is then conveyed to the decision circuit where it is decoded. The decision circuit is, as described above, a Viterbi trellis decoding circuit. The output of the decision circuit is an estimate of the original signal $â_k$.

An error signal $\epsilon_k$ is generated as a difference between the estimated original signal $â_k$ and the equalized sampled digital data $f_k$. This is accomplished in the second summing circuit Σ2. The inputs of the second summing circuit Σ2 are the estimated original signal $â_k$ and the equalized sampled digital data that has had the D.C. noise removed $f_{knc}$. The second summing circuit Σ2 subtractively combines the estimated original signal $â_k$ and the equalized sampled digital data with the D.C. noise removed $f_{knc}$ to form the error signal $\epsilon_k$.

The first D.C. noise cancellation signal DC1 is the D.C. noise cancellation signal that has the smallest time latency and is subtractively combined with the equalized sampled digital data $f_k$ at the summing circuit Σ6. The first D.C. noise cancellation signal DC1 is formed as a function of the error signal $\epsilon_k$ in the first noise cancellation circuit DCC1. The first D.C. noise cancellation circuit performs the function to create the D.C. noise cancellation signal DC1 according to the formula:

$$DC1_{n+1} = DC1_n + \mu_{dc1} \times \epsilon_k$$

where:

$DC1_n$ is the first noise cancellation signal for the current sampling time of the received signal;

$DC1_{n+1}$ is the first noise cancellation signal for the next sampling time of the received signal;

$\mu_{dc1}$ is a first loop gain constant;

$\epsilon_k$ is the error signal determined by the formula:

$$\epsilon_k = f_{knc} - â_k$$

where:

$â_k$ is the estimated value of the transmitted signal;

$f_{knc}$ is an equalized, noise cancelled received signal of the current sampling.

To minimize the complexity of the design of the D.C. noise cancellation circuit, the second D.C. noise cancellation signal DC2 is subtractively combined with the received signal $a_{irec}$ to eliminate a portion of the D.C. noise from the received signal $a_{irec}$. The second D.C. noise cancellation circuit DCC2 forms the second D.C. noise cancellation signal as a function of the error signal $\epsilon_k$ in combination with the first D.C. noise cancellation signal to effectively decouple the first and second D.C. noise cancellation circuits DCC1, DCC2. The second D.C. noise cancellation circuit DCC2 executes the formula:

$$DC2_{n+1} = DC2_n + \mu_{dc1} \times (\epsilon_k + DC1_n)$$

where:

$DC2_n$ is the second noise cancellation signal for the current sampling time of the received signal;

$DC2_{n+1}$ is the second noise cancellation signal for the next sampling time of the received signal;

$\mu_{dc2}$ is a second loop gain constant;

$\epsilon_k$ is the error signal determined by the formula:

$$\epsilon_k = f_{knc} - â_k$$

where:

$â_k$ is the estimated value of the transmitted signal;

$f_{knc}$ is an equalized, noise cancelled received signal of the current sampling;

$DC1_n$ is the first noise cancellation signal for the current sampling time of the received signal.

The first and second loop gain constants $\mu_{dc1}$ and $\mu_{dc2}$ are chosen to have value that is sufficiently small to insure stable operation of the first and second noise cancellation circuits DCC1, DCC2. However, the first and second loop gain constants $\mu_{dc1}$, $\mu_{dc2}$ must be sufficiently large to track any slow variation in the level of the D.C. noise present in the received signal $a_{irec}$.

The first D.C. noise cancellation circuit DCC1 has a first multiplying circuit M1. The input of the multiplying circuit are the error signal $\epsilon_k$ and the first loop gain constant $\mu_{dc1}$. The first multiplying circuit M1 multiplies the error signal $\epsilon_k$ and the first loop gain constant $\mu_{dc1}$ to form a first product at the output of the first multiplying circuit $M_1$.

The first product is an input of the third summing circuit Σ3 where it is additively combined with the current level of the first D.C. noise cancellation signal $DC1_n$ to form a next first D.C. noise cancellation signal $DC1_{n+1}$. The next first D.C. noise cancellation signal $DC1_{n+1}$ is the input to the first delaying circuit $\tau_{d1}$ which delays the next first D.C. noise cancellation signal $DC1_{n+1}$ by one sampling period. The output of the first delaying circuit $\tau_{d1}$ is the input to the sixth summing circuit Σ6, thus forming the adaptive loop at the decision circuit.

The fourth summing circuit Σ4 additively combines its inputs, which are the error signal $\epsilon_k$ and the first D.C. noise cancellation signal DC1 to form a first sum. The fourth summing circuit effectively returns the first D.C. noise cancellation signal DC1 to the error signal $\epsilon_k$, thus decoupling the first and second D.C. noise cancellation circuits DCC1 and DCC2.

The first sum of the error signal $\epsilon_k$ and the first D.C. noise cancellation signal DC1 is multiplied in the second multiplying circuit $M_2$ by a second loop gain constant $\mu_{dc2}$ to form a second product at its output. The second product is additively combined with the current second D.C. noise cancellation signal $DC2_n$ in the fifth summing circuit Σ5 to form a next second D.C. noise cancellation signal $DC2_{n+1}$. The next second D.C. noise cancellation signal $DC2_{n+1}$ is the input to the second delaying circuit $\tau_{d2}$. The second delaying circuit $\tau_{d2}$ delays the next D.C. noise cancellation signal by one sampling time. The output of the delaying circuit is the input of the first combining circuit Σ1 which subtractively combines the second D.C. noise cancellation signal DC2 with the received signal $a_{irec}$ at the next sampling time of the analog-to-digital converter.

It is well-known in the art that, while the above describes individual circuitry to implement an apparatus that removes the D.C. noise component of a received signal $a_{irec}$, the apparatus may be implemented as a program code for execution on a computational processor. The program code maybe obtained from media such as storage nodes of an internal or external network or stored on a storage media such as read only memory (ROM) or a magnetic disk. Further, while complex and difficult to implement, the apparatus to remove the D.C. noise components of a received signal may be constructed as analog filter circuits using continuous time processing.

Figure 4:
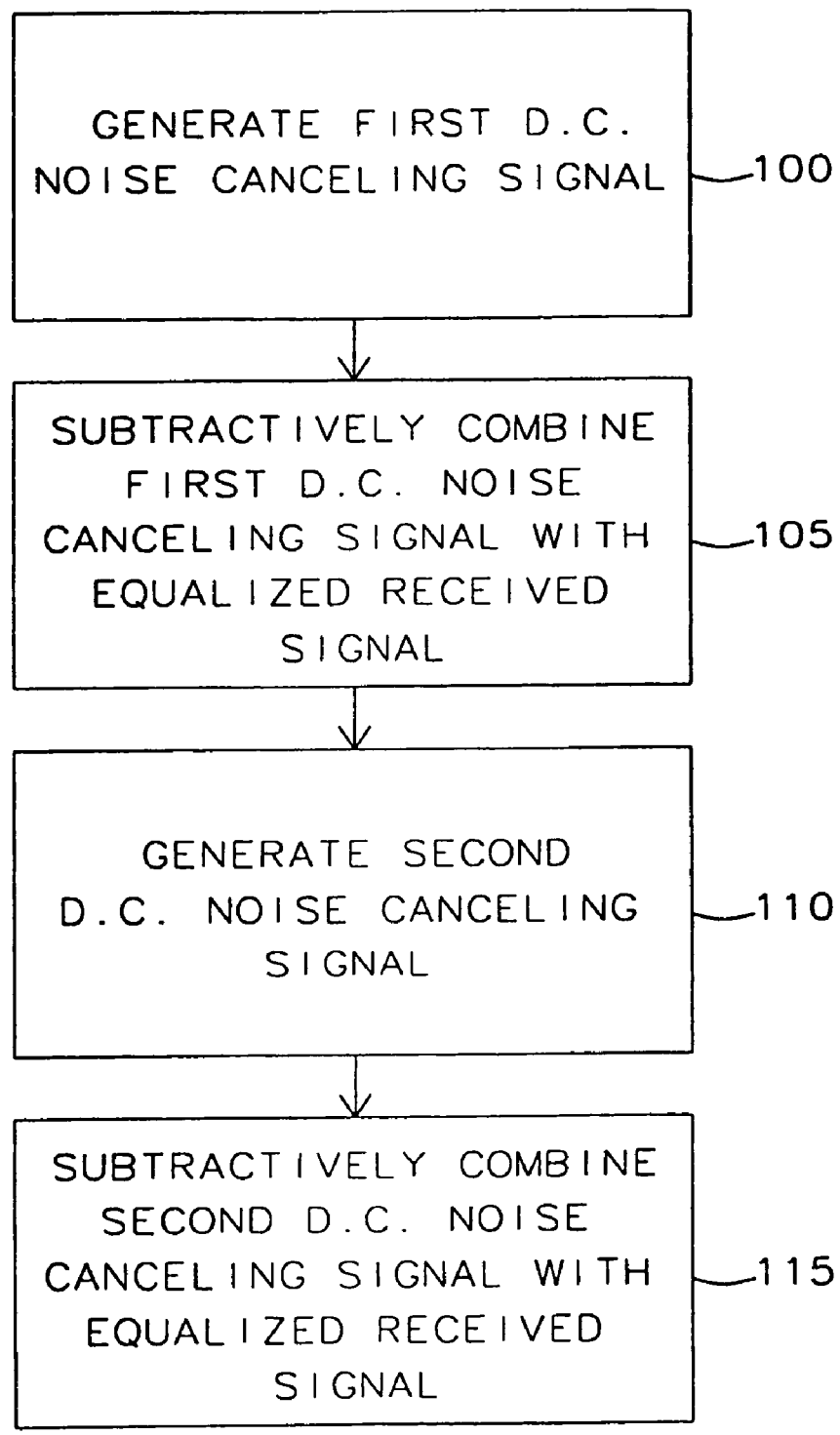
FIG. 4 is a process flow diagram of a method for noise canceling in a receiver of this invention.

The program code executed by the computational processor executes a method for removing D.C. noise components from a received signal described as shown in FIG. 4. The method to remove D.C. noise components from a signal received from a communication channel begins by generating a first D.C. noise cancellation signal 100 as a function of an error signal. The error signal is an estimate of noise within the signal as described above. The first D.C. noise cancellation signal is subtractively combined 105 with an equalized received signal thus removing a first portion of the D.C. noise components from the signal. A second D.C. noise cancellation signal is generated 110 as a function of the error signal and the first D.C. noise cancellation signal. Then subtractively combined 115 with the signal as it is received from the communication channel thus removing a second portion of the D.C. noise components from the received signal.

The generating the first D.C. noise cancellation signal 100 is formed as the function of the error signal according to the formula:

$$DC1_{n+1} = DC1_n + \mu_{dc1} \times \epsilon_k$$

where:
DC1$_n$ is the first noise cancellation signal for the current sampling time of the received signal;
DC1$_{n+1}$ is the first noise cancellation signal for the next sampling time of the received signal;
$\mu_{dc1}$ is a first loop gain constant;
$\epsilon_k$ is the error signal determined by the formula:

$$\epsilon_k = f_{knc} - \hat{a}_k$$

where:
$\hat{a}_k$ is the estimated value of the transmitted signal;
$f_{knc}$ is an equalized, noise cancelled received signal of the current sampling.

The generating the second D.C. noise cancellation signal 110 is formed as a function of the error signal and the first D.C. noise cancellation signal according to the formula:

$$DC2_{n+1} = DC2_n + \mu_{dc1} \times (\epsilon_k + DC1_n)$$

where:
DC2$_n$ is the second noise cancellation signal for the current sampling time of the received signal;
DC2$_{n+1}$ is the second noise cancellation signal for the next sampling time of the received signal;
$\mu_{dc2}$ is a second loop gain constant;
$\epsilon_k$ is the error signal determined by the formula:

$$\epsilon_k = f_{knc} - \hat{a}_k$$

where:
$\hat{a}_k$ is the estimated value of the transmitted signal;
$f_{knc}$ is an equalized, noise cancelled received signal of the current sampling;
DC1$_n$ is the first noise cancellation signal for the current sampling time of the received signal.

Further, the generating the first D.C. noise cancellation signal 100 is a method that begins by multiplying the error signal by a first loop gain constant to produce a first product. The first product is additively combined with a current first D.C. noise cancellation signal to produce a next first D.C. noise cancellation signal. The next first noise cancellation signal is delayed by one sampling time the next first D.C. noise cancellation signal to align.

The generating the second D.C. noise cancellation signal 110 is a method that begins by additively combining the error signal and the first D.C. noise cancellation signal to form a first sum which adds the first D.C. noise cancellation signal back to the error signal to decouple the generating of the first noise cancellation signal from the generating of the second noise cancellation signal. The method continues by multiplying the first sum by a second loop gain constant to produce second product. The second product is additively combined with a current D.C. noise cancellation signal to produce a next second D.C. noise cancellation signal, which is then delayed by one sampling time. The first and second loop gain constants are chosen to have values that are sufficiently small to insure stable operation of the first and second noise cancellation circuits. However, the first and second loop gain constants must be sufficiently large to track any slow variation in the level of the D.C. noise present in the received signal.

While this invention has been particularly shown and described with reference to the preferred embodiments thereof, it will be understood by those skilled in the art that various changes in form and details may be made without departing from the spirit and scope of the invention.

What is claimed is:

1. A receiver, comprising:
   an input circuit,
      wherein the input circuit is configured to receive an input signal;
   an error circuit,
      wherein the error circuit is configured to generate an error signal in accordance with the input signal from the input circuit;
   a first noise canceler responsive to the error circuit,
      wherein the first noise canceler is configured to generate a first noise cancellation signal in response to the error signal from the error circuit; and
   a second noise canceler responsive to the error circuit and the first noise canceler,
      wherein the second noise canceler is configured to generate a second noise cancellation signal from the error signal from the error circuit and the first noise cancellation signal from the first noise canceler, and
      wherein the input circuit is responsive to the second noise cancellation signal from the second noise canceler.

2. The receiver of claim 1, comprising:
   an equalizer in communication with the input circuit.

3. The receiver of claim 2, wherein the equalizer comprises a feedforward/feedback equalizer.

4. The receiver of claim 2, comprising:
   an analog-to-digital converter responsive to the input circuit,
      wherein the equalizer is responsive to the analog-to-digital circuit.

5. The receiver of claim 2, comprising:
   a first adder circuit responsive to the equalizer and the first noise canceler,
      wherein the first adder circuit is configured to subtract the first noise cancellation signal from the first noise canceler from an output of the equalizer.

6. The receiver of claim 5, comprising:
   a decision circuit responsive to the first adder circuit,
      wherein the decision circuit is configured to determine an estimate of the input signal in response to an output of the first adder circuit.

7. The receiver of claim 6, wherein the error circuit comprises:
   a second adder circuit responsive to the first adder circuit and the decision circuit, wherein the second adder circuit is configured to subtract an output of the decision circuit from the output of the first adder circuit to generate the error signal.

8. The receiver of claim 1, wherein the first noise canceler comprises:
an accumulator circuit,
wherein the accumulator circuit is configured to accumulate the error signal from the error circuit, and
wherein an output of the accumulator circuit comprises the first noise cancellation signal.

9. The receiver of claim 8, wherein the first noise canceler comprises:
a scaler circuit,
wherein the scaler circuit is configured to scale the error signal from the error circuit prior to accumulation by the accumulator circuit.

10. The receiver of claim 1, wherein the second noise canceler comprises:
an adder circuit responsive to the first noise canceler and the error circuit,
wherein the adder circuit is configured to add the error signal from the error circuit and the first noise cancellation signal from the first noise canceler to generate an addition signal; and
an accumulator circuit responsive to the adder circuit,
wherein the accumulator circuit is configured to accumulate the addition signal from the adder circuit, and
wherein an output of the accumulator circuit comprises the second noise cancellation signal.

11. The receiver of claim 10, wherein the second noise canceler comprises:
a scaler circuit,
wherein the scaler circuit is configured to scale the addition signal from the adder circuit prior to accumulation by the accumulator circuit.

12. The receiver of claim 1, wherein the input circuit comprises:
an adder circuit,
wherein the adder circuit is configured to subtract the second noise cancellation signal from the input signal.

13. A method of removing noise components from an input signal, comprising the steps of:
a.) receiving the input signal from a communication channel;
b.) generating an error signal in accordance with the input signal received in step (a);
c.) generating a first noise cancellation signal in response to the error signal generated in step (b); and
d.) generating a second noise cancellation signal from the error signal generated in step (b) and the first noise cancellation signal generated in step (c),
wherein step (a) is responsive to the second noise cancellation signal generated in step (d).

14. The method of claim 13, comprising the step of:
e.) equalizing the input signal received in step (a).

15. The method of claim 14, wherein step (e) comprises the step of:
f.) feedforward/feedback equalizing the input signal.

16. The method of claim 14, comprising the step of:
f.) converting an analog input signal from the input signal received in step (a) to a digital signal,
wherein step (e) is responsive to step (f).

17. The method of claim 14, comprising the step of:
f.) subtracting the first noise cancellation signal from an output of step (e).

18. The method of claim 17, comprising the step of:
g.) generating an estimate of the input signal from an output of step (f).

19. The method of claim 18, wherein step (b) comprises the step of:
h.) subtracting the estimate of the input signal from the output of step (f) to generate the error signal.

20. The method of claim 13, wherein step (c) comprises the steps of:
e.) accumulating the error signal from step (b),
wherein an output of step (e) comprises the first noise cancellation signal.

21. The method of claim 20, wherein step (c) comprises the step of:
f.) scaling the error signal from step (b) prior to accumulation in step (e).

22. The method of claim 13, wherein step (d) comprises the steps of:
e.) adding the error signal from step (b) and the first noise cancellation signal to generate an addition signal; and
f.) accumulating the addition signal from step (e),
wherein an output of step (f) comprises the second noise cancellation signal.

23. The method of claim 22, wherein step (d) comprises the step of:
g.) scaling the addition signal from step (e) prior to accumulation in step (f).

24. The method of claim 13, wherein step (a) comprises the step of:
e.) subtracting the second noise cancellation signal from the input signal.

25. A receiver, comprising:
means for receiving an input signal;
means for generating an error signal in accordance with the input signal from the input signal receiving means;
a first means for canceling noise responsive to the error signal generating means,
wherein the first noise canceling means is configured to generate a first noise cancellation signal in response to the error signal from the error signal generating means; and
a second means for canceling noise responsive to the error signal generating means and the first noise canceling means,
wherein the second noise canceling means is configured to generate a second noise cancellation signal from the error signal from the error signal generating means and the first noise cancellation signal from the first noise canceling means, and
wherein the input signal receiving means is responsive to the second noise cancellation signal from the second noise canceling means.

26. The receiver of claim 25, comprising:
a means for equalizing the input signal from the input signal receiving means.

27. The receiver of claim 26, wherein the equalizing means comprises a feedforward/feedback equalizer means for equalizing.

28. The receiver of claim 26, comprising:
means for converting an analog input signal from the input signal receiving means to a digital signal,
wherein the equalizing means is responsive to the analog input signal converting means.

29. The receiver of claim 26, comprising:
a first means for subtracting the first noise cancellation signal from the first noise canceling means from an output of the equalizing means.

30. The receiver of claim 29, comprising:

means for generating an estimate of the input signal from an output of the first subtracting means.

31. The receiver of claim 30, wherein the error signal generating means comprises:

a second means for subtracting the estimate of the input signal from the output of the first subtracting means to generate the error signal.

32. The receiver of claim 25, wherein the first noise canceling means comprises:

means for accumulating the error signal from the error signal generating means, wherein an output of the accumulating means comprises the first noise cancellation signal.

33. The receiver of claim 32, wherein the first noise canceling means comprises:

means for scaling the error signal from the error signal generating means prior to accumulation by the accumulating means.

34. The receiver of claim 25, wherein the second noise canceling means comprises:

means for adding the error signal from the error signal generating means and the first noise cancellation signal from the first noise canceling means to generate an addition signal;

means for accumulating the addition signal from the adding means, wherein an output of the accumulating means comprises the second noise cancellation signal.

35. The receiver of claim 34, wherein the second noise canceling means comprises:

means for scaling the addition signal from the adding means prior to accumulation by the accumulating means.

36. The receiver of claim 25, wherein the input signal receiving means comprises:

means for subtracting the second noise cancellation signal from the input signal.

* * * * *

UNITED STATES PATENT AND TRADEMARK OFFICE
CERTIFICATE OF CORRECTION

PATENT NO. : 7,257,375 B1  Page 1 of 1
APPLICATION NO. : 11/028223
DATED : August 14, 2007
INVENTOR(S) : Runsheng He It is certified that error appears in the above-identified patent and that said Letters Patent is hereby corrected as shown below:

| | |
|---|---|
| Title Page, * Notice | Insert -- This patent is subject to a Terminal Disclaimer -- |
| Column 3, Line 65 | Delete "circuits" and insert -- circuit -- |
| Column 6, Line 63 | Delete "maybe" and insert -- may be -- |
| Column 7, Line 20 | Insert -- of -- after "generating" |
| Column 7, Line 38 | Insert -- of -- after "generating" |
| Column 7, Line 58 | Insert -- of -- after "generating" |
| Column 7, Line 66 | Insert -- of -- after "generating" |

Signed and Sealed this

Sixth Day of May, 2008

JON W. DUDAS
*Director of the United States Patent and Trademark Office*